Patented Aug. 17, 1943

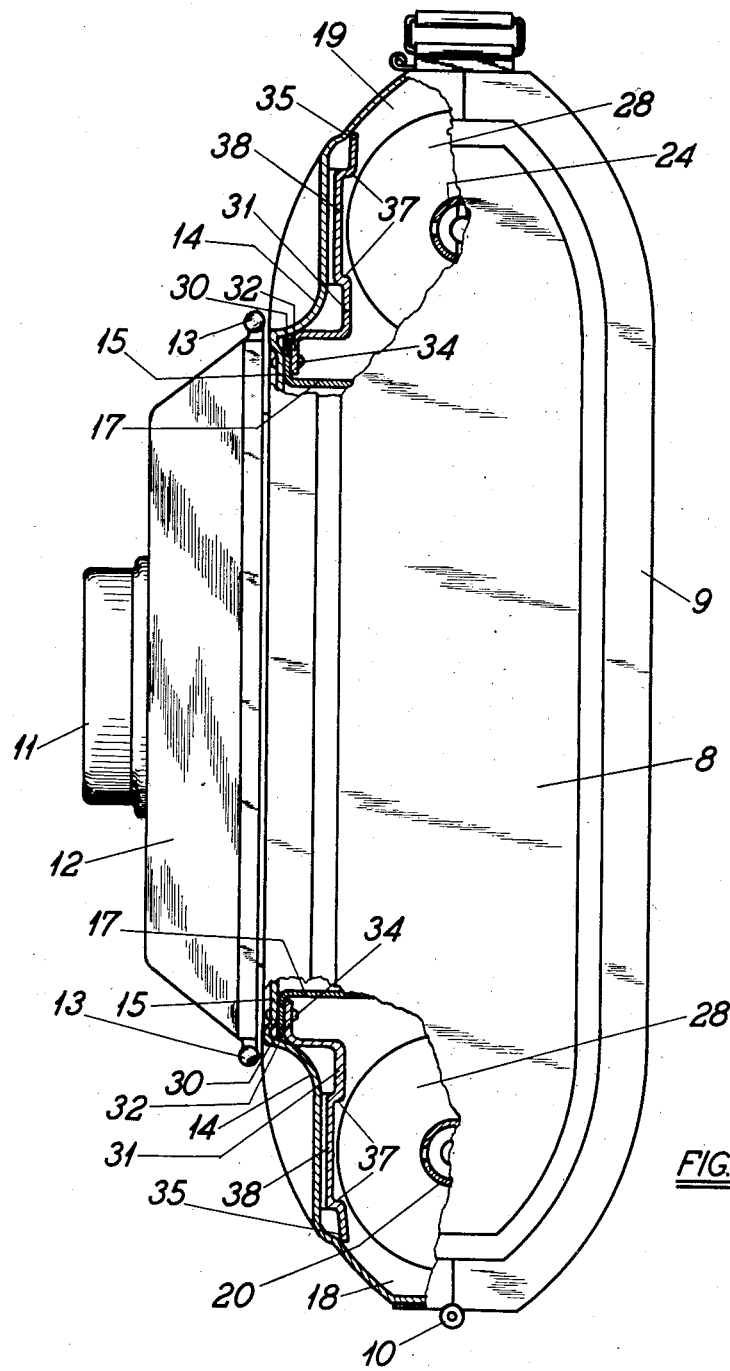

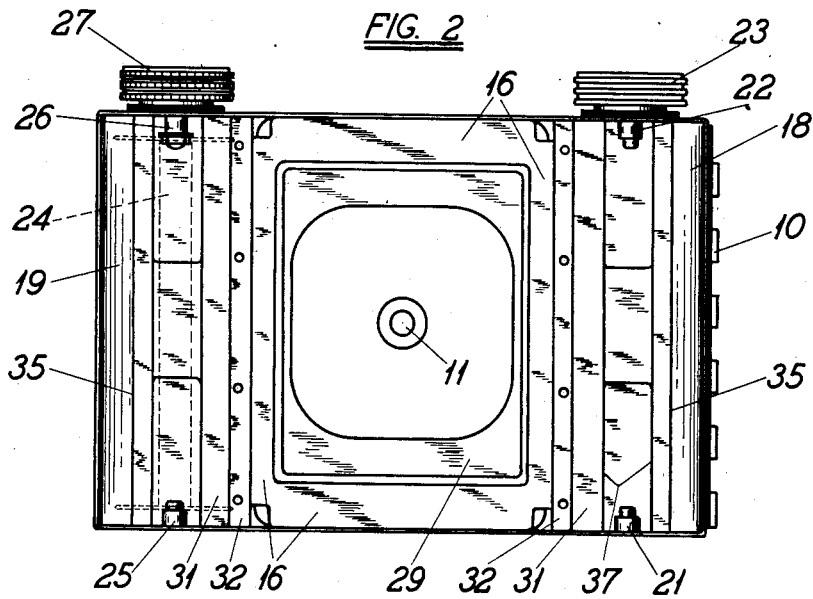
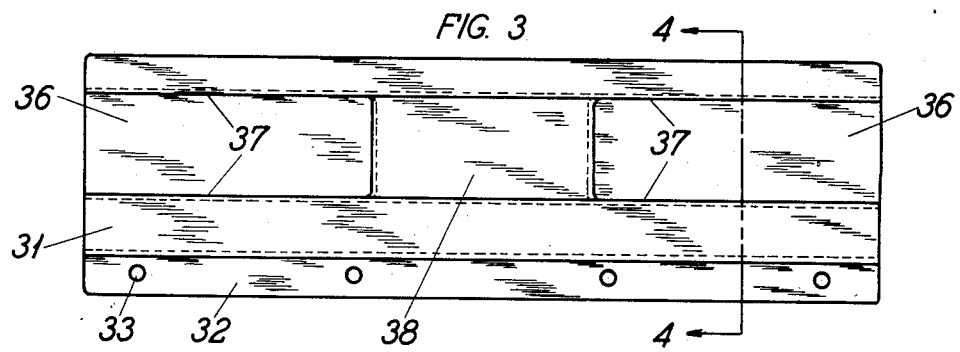
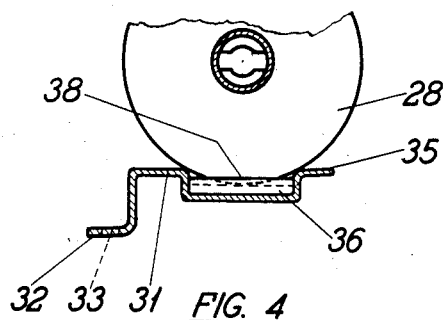

2,326,870

UNITED STATES PATENT OFFICE 2,326,870

ROLL HOLDING CAMERA CONSTRUCTION

Lew W. Lessler, Johnson City, N. Y., assignor, by mesne assignments, to General Aniline & Film Corporation, New York, N. Y., a corporation of Delaware Application April 29, 1939, Serial No. 270,841

3 Claims. (Cl. 95—31)

My invention relates to a form of construction for cameras which are adapted to hold roll film. More particularly, the invention relates to an improved construction for supporting a film spool while loading the camera and for preventing light leakage into the film spool chambers of such a camera.

In a common form of construction, the camera is provided with an exposure chamber extending from the front of the camera to the focal plane thereof, at which point there is provided a supporting surface and exposure frame for a light sensitive film. In this construction there is considerable danger of light leakage into the film spool chambers at the point where the exposure chamber is joined to the camera wall. Another disadvantage of many roll film cameras is the difficulty of loading the film spools into the spool chambers and engaging the winding spindles with said spools.

With these defects and disadvantages of the prior art in view one object of my invention is to provide a new and useful camera construction. Another object is to provide a form of construction in which light leakage from the exposure chamber to the spool chambers will be prevented. A further object is to provide means for supporting the film spools while loading the camera. Still another object is to provide supporting means which will align the film spool with the customary spindles and at the same time will leave the spool free to rotate once the spindles are engaged. An additional object is to provide an economical and compact form of construction embodying the above objects. Other objects and advantages will appear from the following specification.

My invention accordingly comprises the construction and arrangement, a preferred form of which is exemplified in the accompanying drawings forming a part of this application, wherein Fig. 1 is a broken partial sectional view of a camera construction embodying my invention, Fig. 2 is a view of the interior of the camera from the rear with the camera back removed for clearness, Fig. 3 is a view of a combination spool support and lining member made according to my invention, and Fig. 4 is a sectional view on the line 4—4 of Fig. 3 showing the position of the film spool during the loading operation.

In order that those skilled in the art may fully understand the nature and scope of my invention I shall now give a complete and detailed description thereof, with particular reference to the accompanying drawings wherein like reference characters indicate like parts.

The camera body 8 is provided with the customary camera back 9 suitably hinged to the body at 10. A lens 11 is mounted on a lens carrying member 12 which may be slidably connected to said body in known manner. Thus when it is desired to use the camera the lens and lens carrying member may be extended from the camera body to the required operative position depending on the focal length of the lens and other known factors. To facilitate the movement of this lens carrying member 12 to operative position, it is provided with suitable finger pieces 13 disposed directly adjacent to finger recesses 14 provided in the front wall 15 of the camera body, as is described and claimed in application Serial No. 175,310 of Bornmann and Lessler, filed November 18, 1937.

With reference to Fig. 2 the camera is provided with the customary focal plane supporting surface and exposure frame 16 for the light sensitive film. This exposure frame is connected to the front wall 15 of the camera by means of the shell member 17 (see also Fig. 1). This shell member surrounding the optical axis of the camera forms the customary exposure chamber through which light passes from the lens to the film. On opposite sides of this exposure chamber are thus formed the spool chambers 18 and 19. A supply spool 20 may be mounted in the chamber 18 between the fixed bearing 21 and the axially movable spindle 22 attached to the knob 23. The film (not shown) is led from such spool over the exposure frame 16 to a takeup spool 24 mounted in the spool chamber 19 between the fixed bearing 25 and the axially movable spindle 26 connected to the winding knob 27. The film spools 20 and 24 are provided with the customary spool flanges 28. Suitably positioned inside the exposure chamber is a masking or limiting flange or member 29 which determines the maximum amount of light passing from the lens to the supporting surface and exposure frame. The exposure chamber shell 17 is provided with flanges 30 projecting toward the spool chambers 18 and 19 adjacent the front wall 15 of the camera body. Inside each spool chamber and also adjacent the front wall of the camera body is a combination lining member and spool support 31. These lining members extend substantially across the spool chambers in both directions (axially and perpendicularly thereto) adjacent the front wall. The lining members 31 are provided with flanges 32 extending toward the exposure frame shell 17 and adapted to overlap the corresponding flanges 30 on said shell, as shown in Fig. 1. The flanges are all provided with suitable openings 33 through which rivets 34 may pass to join the lining member and exposure chamber shell to the front wall as shown. The outer end 35 of the lining and support member 31 rests against the front wall of the camera as shown in Fig. 1, thereby securing additional rigidity and support.

The members 31 are provided with recessed portions 36 extending substantially across said members parallel to the axes of the film spools. The edges of this recessed portion or channel 36 may be sharply defined so as to form shoulders 37, also parallel to the film spool axes. The intermediate portion 38 of the groove 36 may be more shallow than the rest of the groove in order to conform to the shape of the inwardly recessed portions 14 of the front wall 15, as appears from Fig. 1.

It will be readily seen that in loading the camera the film spool flanges 28 will receive a 4-point support against the shoulder 37 of the lining and support member 31. Thus the spool will rest firmly in place and in substantial alignment with the bearing spindles during this operation, as shown in Fig. 4. In order to prevent frictional engagement between said support member and spool flanges, however, my invention provides for spacing these supporting members slightly farther from the axis of the bearing spindles than the radial distance to the edges of the flanges when the spools are finally mounted on said bearings and spindles. Thus, if the camera is held with its lens side downward during loading and the film spools are placed on these lining and support members, the axes of the spools themselves will be just slightly below the axes of the bearings and spindles. This difference in alignment is almost imperceptible but is nevertheless an important feature. The separation is such that the engagement of the bearings and spindles with the film spools will have a slight camming action so as to lift the spool flanges clear of the supporting member. In this way the spool will be free to rotate without frictional contact against said supporting members. To assist in this camming action, the ends of the bearings 21 and 25 and of the spindles 22 and 26 may be rounded slightly as shown in Fig. 2. Thus my invention makes possible a much simpler and more convenient method of loading a roll film camera without at the same time hindering the free movement of the parts thereof.

It will be readily apparent that the support member 31 is not only useful in holding the film spool as just described, but is also extremely efficient in preventing light leakage from the exposure chamber into the spool chamber. Thus, if some light were to penetrate between the front wall 15 and the flange 30 on the exposure chamber shell, instead of passing directly into the spool chambers as would normally be the case, such light would now have to travel on around the flange 32 of the lining and support member 31 and between such member and the front wall to the extreme end 35 of said lining member before actually reaching the spool chamber. The irregular nature of this path makes such leakage highly improbable.

Minor variations and equivalent forms of construction will be readily apparent to those skilled in the art. The nature and scope of my invention are therefore not to be limited by the precise form of construction shown in the drawings but only by the appended claims.

I claim:

1. A roll holding camera comprising a body, a lens, an exposure chamber joined to the front of said body and extending inwardly from said front, film spool chambers in said body at opposite sides of said exposure chamber, said exposure chamber having a flange projecting into one of said spool chambers along the lens side of the camera, and a lining member extending substantially across said spool chamber in both directions along the lens side of the camera, said lining member being inwardly and overlappingly attached to said exposure chamber flange whereby light leakage into said spool chamber is prevented.

2. A roll holding camera comprising a body, a lens, an exposure chamber and supporting surface in said body for a light sensitive film, film spool chambers with axially movable film spool spindles in said body at opposite sides of said exposure chamber, said exposure chamber having a flange projecting into one of said spool chambers along the lens side of the camera, and a lining and support member extending substantially across said spool chamber in both directions along the lens side of the camera, said lining and support member being inwardly and overlappingly attached to said exposure chamber flange whereby light leakage into said spool chamber is prevented, said lining and support member further being provided with a recessed portion parallel to the spool chamber axis in which a flanged film spool may be supported in loading the camera, said lining and support member being spaced from the spool axis a distance slightly greater than the radius of the spool flanges whereby the axial engagement of the spool spindle slidably lifts the spool away from said lining and support member and permits rotation of the spool without frictional contact against said member.

3. A roll holding camera comprising a lens and lens carrying member, a body portion having an opening in its front wall into which said lens carrying member may be retracted, an exposure chamber surrounding said opening and extending back into said body and forming a supporting surface for a light sensitive film, film spool chambers in said body at opposite sides of said exposure chamber, said exposure chamber having a flange projecting into one of said spool chambers along the front wall of the camera body and by which said exposure chamber is joined to said front wall, and a lining member extending substantially across said spool chamber in both directions along said front wall, said lining member being inwardly and overlappingly attached to said exposure chamber flange, whereby said lining member, exposure chamber and front wall are joined together and light leakage into said spool chamber from said opening is prevented.

LEW W. LESSLER.